Jan. 31, 1967  M. L. FRALEY ET AL  3,301,982
FLUID SWITCH HAVING DEFORMABLE ENVELOPE AND ENVELOPE
CLOSURE MEANS OF MATCHED CONFIGURATION
Filed Dec. 4, 1964  5 Sheets-Sheet 1

INVENTOR.
MELVIN LAWRENCE FRALEY
CHRISTOPHER KINGSLEY BROWN
BY Curtis, Morris & Safford

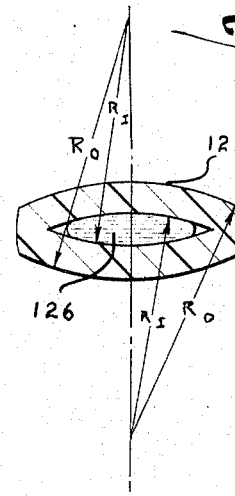
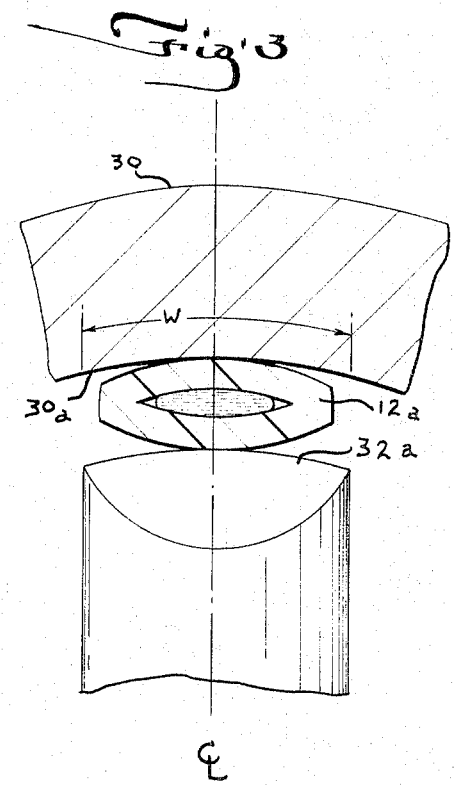
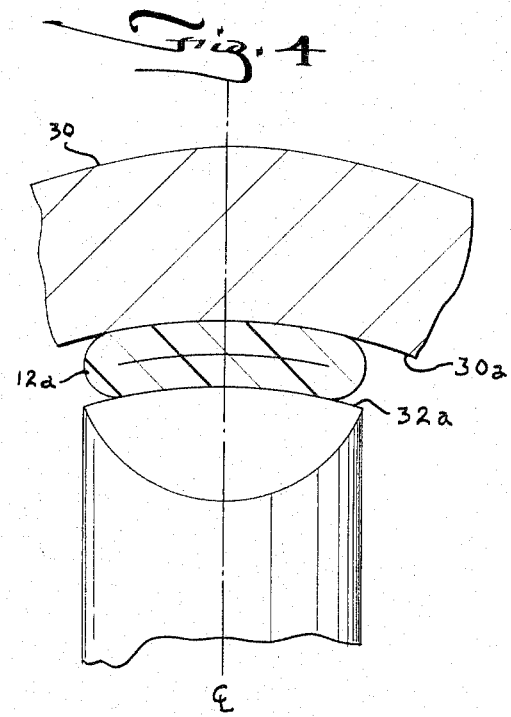

Jan. 31, 1967 M. L. FRALEY ET AL 3,301,982
FLUID SWITCH HAVING DEFORMABLE ENVELOPE AND ENVELOPE
CLOSURE MEANS OF MATCHED CONFIGURATION
Filed Dec. 4, 1964 5 Sheets-Sheet 3

INVENTOR.
MELVIN LAWRENCE FRALEY
CHRISTOPHER KINGSLEY BROWN
BY Curtis, Morris & Safford

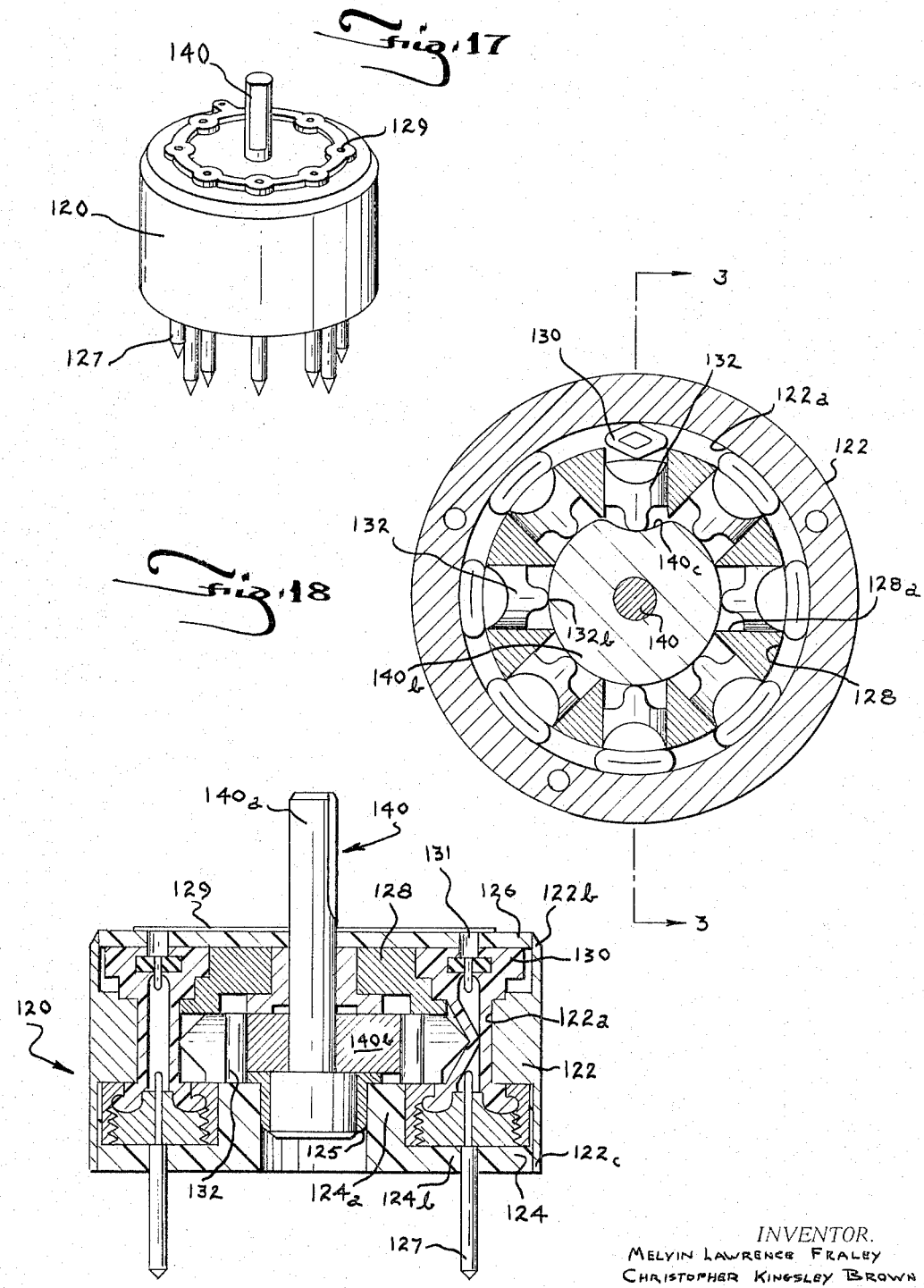

Jan. 31, 1967   M. L. FRALEY ET AL   3,301,982
FLUID SWITCH HAVING DEFORMABLE ENVELOPE AND ENVELOPE
CLOSURE MEANS OF MATCHED CONFIGURATION
Filed Dec. 4, 1964                                    5 Sheets-Sheet 5

INVENTOR.
MELVIN LAWRENCE FRALEY
CHRISTOPHER KINGSLEY BROWN
BY Curtis, Morris & Safford

United States Patent Office 3,301,982
Patented Jan. 31, 1967

3,301,982
FLUID SWITCH HAVING DEFORMABLE ENVELOPE AND ENVELOPE CLOSURE MEANS OF MATCHED CONFIGURATION
Melvin Lawrence Fraley, Harrisburg, and Christopher Kingsley Brown, Camp Hill, Pa., assignors to AMP Incorporated, Harrisburg, Pa.
Filed Dec. 4, 1964, Ser. No. 416,080
8 Claims. (Cl. 200—152)

This invention relates to an electrical switch device having a bounce-free operation.

There is a present need for a bounce-free electrical switch capable of operation in manual or relay driven modes without transients and without introducing an excessive switching noise into the system of use. This is because communication and computation equipment is driven to operate by signals of a distinct amplitude, width or frequency and the measure of discrimination between the presence or absence of a signal determines the reliability of the system in carrying out its function. The presence of transients caused by switch bounce or other uncontrolled signal noise adversely affects discrimination and additionally can cause spurious actuation of proximate but unrelated circuit components.

Switch bounce is inherent in any contact closure system wherein one of the components has spring characteristics. Because of this and as an approach to eliminate switch bounce, workers in the art have turned to the use of conductive fluid such as mercury, and various means have been employed to effect a controlled displacement of the conductive fluid into and out of engagement with circuit electrodes. These efforts have met with considerable success in applications where the use is under normal conditions. One example which has come to be widely accepted in lighting and heating control applications is a silently operating gravity switch which utilizes a tube of mercury tilted by manual operation of a toggle linkage. Still other approaches employ centrifugal force, diaphragm pressure, electrode displacement through mercury vessels and, more pertinent to this case, deformation of flexible columns as in U.S. Patent Nos. 2,195,199 and 2,720,-562. All of these efforts recognize the advantages of the exceptional quality of the make and break action achieved utilizing conductive fluid.

As far as is known, all of these efforts fall short of meeting even the most general requirements of present day communication and computation equipment. For example, the previously mentioned tiltable tube used for lighting and heating applications is unacceptable when the rate of operation becomes even a fraction of typing speeds. If any degree of acceleration-inertia requirement is introduced, as is the case in applications of use aboard vehicles, fluid switch structures having nonconfined or movable pockets of conductive fluid as adapted for static use become unacceptable.

As a most important point, a practical switch device must operate reliably for at least a million cycles. The flexible tube approaches the prior art which use circular or ovular vessels are considered deficient in this respect due to a rupture of the tube caused by an excessive working of the tube material.

It is an object of the present invention to provide a bounce-free electrical switch utilizing conductive fluid as the contact making and breaking medium through a novel fluid capsule and drive structure.

It is a further object of the invention to provide a conductive fluid capsule for electrical switches which has material characteristics and a geometry to permit deformation for switch closure with a minimum movement and stress developed in the capsule material and with a snap action.

It is another object of the invention to provide a conductive fluid electrical switch capable of operation under adverse conditions through a large number of switch cycles.

It is yet another object of the invention to provide a conductive fluid stepping switch which may be operated at higher speeds than heretofore possible.

It is a general object of the invention to provide a conductive fluid electrical switch of simplified and inexpensive construction capable of substantially bounce-free operation.

The foregoing objectives are attained through a conductive fluid capsule so shaped as to be driven in closure to effect a parting of the conductive fluid with a minimum motion and loading of the capsule material. The configuration of the capsule is such as to readily facilitate production and use and there is incorporated in an improved electrode structure with means for loading and sealing the conductive fluid therein. In conjunction with the configuration of the capsule, a capsule deforming means is provided which is so shaped as to minimize wear and tear of the capsule material and to permit and maintain a separation of the conductive fluid column therein for switch operation.

As a further aspect of the invention, several embodiments of rotary stepping switches are contemplated employing the novel capsule of the invention.

In the drawings:
FIGURE 1 is a perspective, much enlarged, of a sealed capsule representing one embodiment of the invention;
FIGURE 2 is a cross-section taken through lines 2—2 of the capsule of FIGURE 1 to show in detail the configuration of the conductive fluid column of the invention;
FIGURES 3 and 4 are schematic diagrams showing the fluid column of the capsule of the invention in opened and closed positions relative to portions of actuating means operable to deform the capsule for switch operation;
FIGURE 5 is a section taken longitudinally of a capsule like that shown in FIGURE 1, but prior to loading and sealing;
FIGURE 6 is a section taken longitudinally through lines 6—6 of the embodiment of FIGURE 1, depicting the capsule as loaded and sealed;
FIGURE 7 is a perspective of a capsule in accordance with a further embodiment of the invention useful with an alternative sealing means;
FIGURE 8 is a longitudinal section of the type of capsule shown in FIGURE 7 including the preferred sealing and electrode arrangement for this embodiment;
FIGURE 9 is a perspective of a further embodiment of the capsule of the invention adapted for applications of higher current.
FIGURE 10 is a cross-section taken through lines 10—10 of the embodiment of FIGURE 9;
FIGURE 11 is a perspective of an embodiment of the invention adapted for production in materials of substantial flexibility;
FIGURE 12 is a cross-section taken through lines 12—12 of the embodiment of FIGURE 11;
FIGURE 13 is a perspective of a further embodiment of the capsule of the invention adapted to permit a simplified mounting arrangement;
FIGURE 14 is a cross-section taken through lines 14—14 of the embodiment of FIGURE 13;
FIGURE 15 is yet a further perspective of the embodiment of the capsule of the invention adapted to facilitate the use of a flat surface capsule closure means;
FIGURE 16 is a cross-section taken through lines 16—16 of the embodiment of FIGURE 15;

FIGURE 17 is a perspective of a stepping switch in accordance with one aspect of the invention;

FIGURE 18 is a cross-section, somewhat enlarged, taken through lines 18—18 of the switch of FIGURE 17;

FIGURE 19 is an enlarged elevational section taken through lines 19—19 of FIGURE 17;

Figure 1:
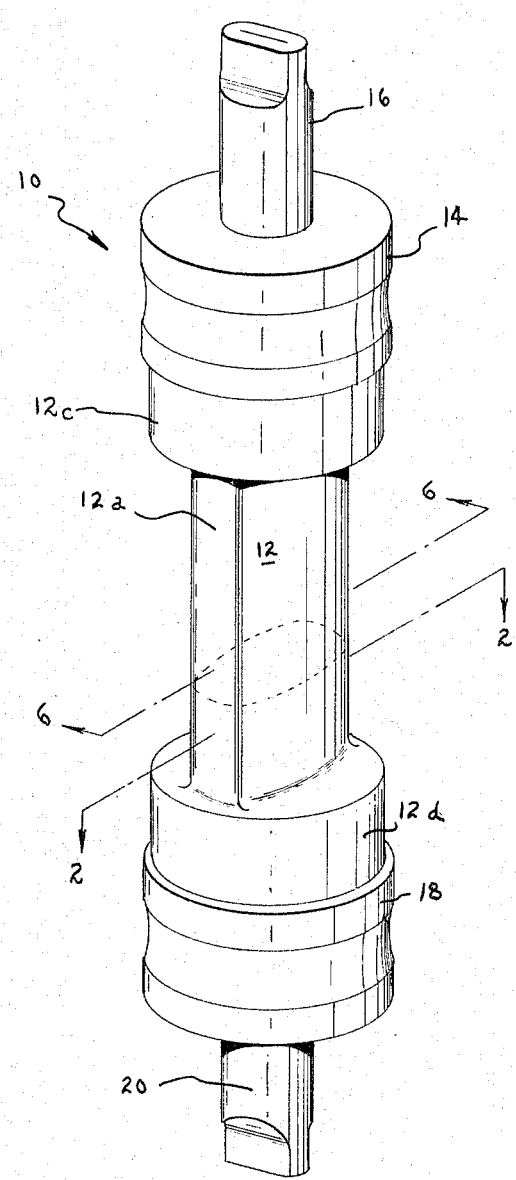
Figure 6:
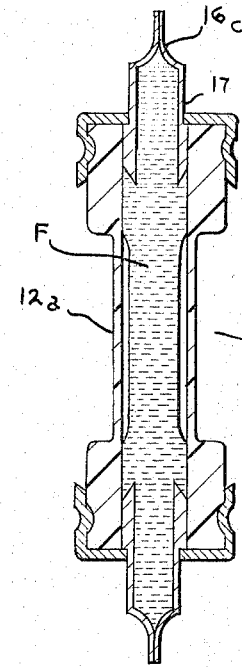

Referring now to FIGURES 1 and 6, the conductive fluid capsule of the invention is shown in one embodiment as 10 and is comprised in this embodiment of a plastic and insulating housing 12, sealing members 14 and 18 and electrodes 16 and 20, which also facilitate loading and sealing a conductive fluid F within the capsule. In use an electrical circuit is terminated to the electrodes 16 and 20 with conduction through the capsule being maintained by the conductive fluid F contacting the electrodes and extending therebetween through the capsule body. Switch operation is effected by deforming the capsule body near the center thereof as indicated by the dotted line in FIGURE 1 to a point wherein the fluid cohesive force causes a rapid breaking apart of the fluid into separate and isolated parts with a complete closure of the interior surfaces of the capsule to prevent vibration or inertia from reestablishing conduction.

As is indicated from FIGURES 1–6, the capsule body 12 has a central portion 12a of relatively thin wall dimensions integrally joined at each end by larger and somewhat cylindrical portions 12c and 12d of relatively thick wall dimensions. The interior of the portion 12a is shaped as is indicated by numeral 12b in FIGURES 2, 5 and 6 to define a column for conductive fluid which is longer than it is wide and considerably wider than it is thick. The volume there defined opens into a generally cylindrical passage within the end portions 12c and 12d to receive and accommodate the generally cylindrical electrode members 16 and 20 inserted therein. From this description it will be apparent that the capsule of the invention includes a general feature wherein there is a relatively thin column of conductive fluid having at either end an enlarged head of conductive fluid contacted by the electrodes of the switch device. It will be further apparent that the relatively thin column of conductive fluid is substantially longer than is necessary to define the effective zone of closure or enforced collapse of the capsule to accomplish the switching function.

The thinness of the column in conjunction with the sharply tapered edges, as will be hereinafter demonstrated, operates to permit a closure by an enforced deformation of the capsule material with a minimum movement and loading of the capsule material. The length of the column, in conjunction with the thinness thereof along a length greater than that which is necessary to permit closure, operates to accommodate displacement of the conductive fluid by the compression of the column of the capsule in the center thereof. The additional volume forming the substantial portion of the total conductive fluid in the capsule present at the ends of the relatively thin column operates to ensure a large contact area wetted against the device electrodes and for other reasons to be hereinafter described is advantageous to providing an effective seal of the conductive fluid within the capsule.

The body 12 of the capsule is of insulating and at least in portion 12a of flexible and distensible material. Further and preferred characteristics will become apparent from the description to be now given relative to manufacture and use. Turning first to FIGURE 2 the preferred shape of 12a includes wall surfaces having a cross-sectional dimension formed by radii taken along a center common to the interior and exterior surfaces of a common side of the capsule. The exterior cross-sectional configuration of 12a is, in essence, four-sided with the main or width dimensions being arcuately shaped by carrying the radius $R_O$ along the length thereof. The end edges of the capsule are cut off at a point to define an adequate thickness of the wall portion which approaches the thickness of the sides of the wall. The interior configuration of the capsule is essentially two-sided, formed by radii taken from a center line common with the exterior surface of the same side, such being shown as $R_I$, swept to a point of intersection between opposing wall sides. Both $R_O$ and $R_I$ are held large relative to the width of 12a and spaced to provide a thin column of fluid. The walls of the capsule in portion 12a are thus arcuate and opposed and joined at the ends thereof by a zone of common material with sharply tapered interior corners. This configuration tends to hold the capsule open and to resist deformation of closure and at the same time permit the corners to be easily and positively closed. The reduction of the volume of conductive fluid F at the point of closure accomplished by this configuration operates to reduce the required work per switch cycle. As a basic point, the sharply tapered surfaces operate relative to the cohesive force of the fluid to leave slight voids as indicated extending along the column. These voids permit the conductive fluid to "snap" apart due to surface tension as the capsule is deformed without developing a vacuum which would tend to develop an atmosphere of conductive fluid molecules and thus lower the arcing potential of the device.

Figure 22:
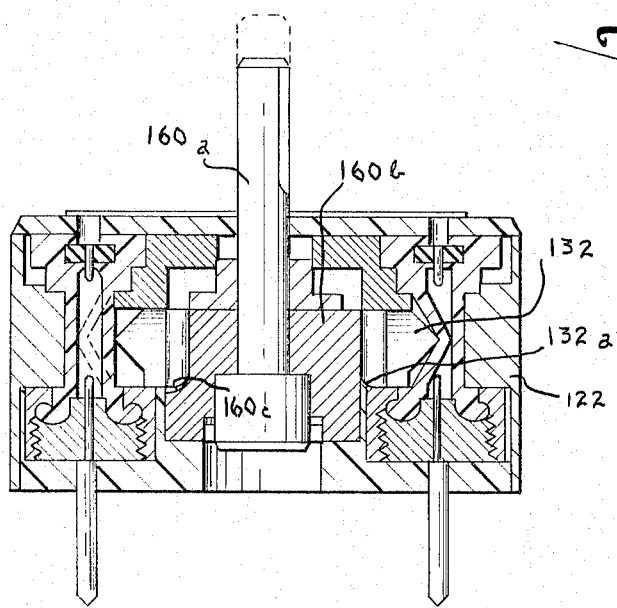
FIGURE 22 is an elevational section of the alternative version of the stepping switch covered in FIGURES 20 and 21.

Referring now to FIGURE 3, the capsule configuration is shown in the open position as in FIGURE 2, but positioned in means adapted to effect closure of the capsule including a member 30 and a member 32. The member 30 has an interior surface in width shown as 30a having a curvature based on a radius approximately that of $R_O$ of the capsule and is comprised of a material substantially harder than that of the capsule. The member 32 has a surface in width shown as 32a curved along a radius substantially equal to $R_I$ of the capsule and is comprised of a material also substantially harder than that of the capsule. The surfaces 30a and 32a are made to have a width W sufficiently greater than the relaxed capsule width w so as to accommodate expansion of the capsule material during deformation. The surface 30a is extended along the length of 12a for a substantial portion thereof and the surface 32a is generally rounded to engage the capsule in a line contact transverse to the length of 12a. This is generally indicated in the embodiments of FIGURES 19 and 22.

The rounding of 32a in this session is held to reduce wear and tear on the capsule material and more importantly to permit the conductive fluid to separate under surface tension to provide its rapid and bounce-free switch action. This occurs as follows; as the members 30 and 32 move relatively together and the capsule is deformed, a point reached wherein the cohesive force of the fluid in the two relatively large bodies of fluid on either side of the point of deformation operates to cause a quite rapid separation breaking conduction therebetween.

In FIGURE 4 the capsule is shown as in complete closure to maintain a separation of the conductive fluid. As is indicated, the capsule material is compressed along the line of movement of members 30 and 32 and is expanded in a radial sense relative thereto. It should be appreciated, however, that this working of the material and the stroke of 30–32 is considerably less than if the capsule were cylindrical, ovular, or of a shape other than that shown. The former is related to longevity and the latter to speed of operation. As can be seen, the interior shaping of the surfaces of the capsule assists in maintaining a positive closure to separate the conductive fluid column; the radii of 30a and 32a and the opposing surfaces of the capsule matching to provide an even and positive pressure upon the capsule.

Upon reverse movement of 30–32, the isolated bodies of fluid move together to a point wherein the cohesive forces cause a rapid commoning of the fluid surfaces to restore conduction.

It is contemplated that either the member 30 or the member 32 may be moved along the center line shown in FIGURES 3 and 4, the other member being held relatively fixed. The members 30 and 32 may be part of a single make-or-break switch suitably held or driven by a solenoid or relay type drive, or by hydraulic or pneumatic means, or by a manual push button with some suitable latching means to hold one of the members in engagement. It is also contemplated that both of the members 30 and 32 may be moved inwardly to effect closure of the capsule and outwardly to effect an opening of the capsule.

Figure 5:
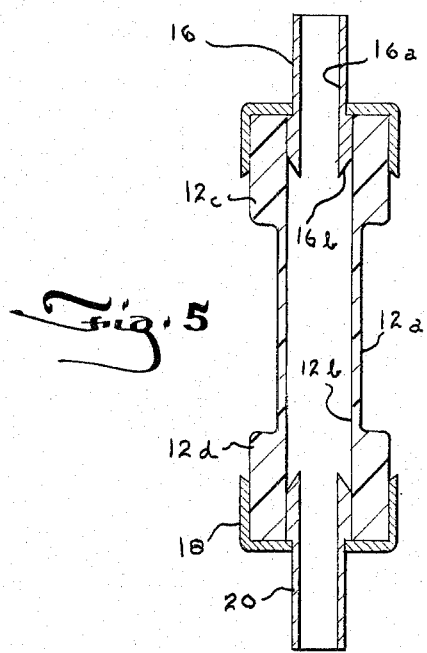

Referring now to FIGURES 5 and 6, additional details of the material characteristics and configuration of the capsule of the invention will now be given. The portions 12c and 12d are shown as generally cylindrical and of thickened wall dimension. This serves two purposes. First, in miniature sizes the enlargement of the capsule ends facilitates mounting the capsule, the mounting member being applied to the relatively rigid portions formed by 12c and 12d. Secondly, through the enlargement provided to the exterior interior surfaces of 12c and 12d, the area of seal is substantially increased to reduce the pressure-per-square inch caused by compression of the capsule and displacement of the conductive fluid therein. As a still further point the interior enlargement of 12c and 12d permits for the use of electrodes larger in area, to thus expose the electrodes to a larger area of contact with conductive fluids contained in the capsules.

FIGURE 5 shows a capsule body 12 having members 14–16 and 18–20 inserted thereon. In this position the capsule may then be loaded with conductive fluid and sealed by any suitable means. It is contemplated that the members 14 and 18 may be of plastic material bonded to the plastic of the capsule and to the electrodes. Alternatively, and in a preferred embodiment, the members 14 and 18 are formed of malleable material such as tin-plated copper of a suitable thickness to permit a deformation around the circumference thereof in the manner indicated in FIGURES 1 and 6 to seal against the escape of conductive fluid contained therein. In this embodiment the electrodes 16 and 20 are preferably formed of tubular members of a configuration shown having an interior surface increased as by the beveling indicated in FIGURES 5 and 6 and an exterior thickness suitable for deformation for closure of the tubes to seal the conductive fluid therein. The material of the electrodes 16 and 20 is preferably such as to not react with the particular conductive fluid of use. In an actual embodiment a relatively pure nickel alloy was used for members 16 and 20 with the conductive fluid being triple distilled mercury. This combination of materials was found to operate quite successively throughout a practical range of currents and voltages.

In practice in a preferred embodiment with the capsule assembled as shown in FIGURE 5, the members 14 and 18 are deformed to effect a seal and the capsule is then positioned with one of the ends of the open electrodes 16 and 20 placed in the conductive fluid. A low pressure is then applied to the other end to draw conductive fluid into the capsule filling the volume thereof. Thereafter, the ends of 16 and 20 are closed as by a deformation as indicated in FIGURE 6. As an additional precaution, further sealing material as at 17 may be deposited as indicated in FIGURE 6 by soldering, brazing or the like, applied to the ends of 16 and 18 over the deformed portion and at the point of juncture of 16 and 18, with 14 and 18, respectively. It is preferred to load the capsule with conductive fluid under a slight positive pressure, developed through a gas which is inert relative to the particular conductive fluid used. Nitrogen has been found to be a practically acceptable medium for use in conjunction with triple distilled mercury. It is preferred to load the capsule to a degree leaving the slight voids shown which remain disposed along the column due again to the cohesive force of the fluid. The void of gas left should be limited so that under no condition of attitude or inertia can the electrodes the separated completely from the fluid, nor can the column separate without a forced closure of the capsule. The presence of a slight volume of inert gas will preclude any vacuum being developed in use which would tend to vaporize the conductive fluid and encourage arcing.

The foregoing description should make it clear that the configuration or geometry of the capsule is quite important. This is not to say that the capsule material characteristics may be ignored, but only that the configuration of the capsule does add significantly to the use of any insulating and flexible material. In practice, it is preferred that the material employed have good tensile strength, medium hardness, at least fair tear resistance, substantial abrasion resistance and at least good resistance to compression set and good rebound. Resistance to sunlight aging, heat aging, and resistance to change in resiliency due to heat and cold is desirable. As an important point the adhesive force of the material should be chosen relative to the cohesive force of the conductive fluid to insure a proper surface tension. In an actual embodiment found to be acceptable a material was employed having a tensile strength approximately 2000 p.s.i., a durometer of between 60 and 95 with the other factors above-mentioned being rated from fair to excellent. The dielectric strength and electrical insulation of this material were classified as excellent and good, respectively. This material is identified as a copolymer of vinylidene fluoride and hexafluoride propylene and is sold by the E. I. du Pont de Nemours Company, Inc., under the trade name Viton. An alternative material found to be acceptable and having similar characteristics was the polyurathene elastomer, Adiprene, also a du Pont trade name.

Figure 7:
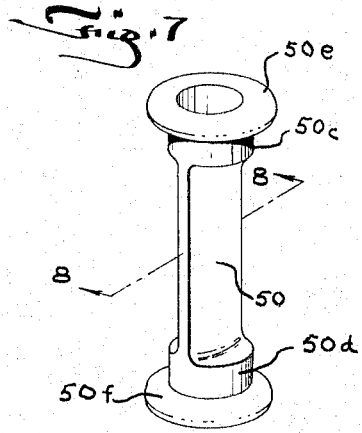
Figure 8:
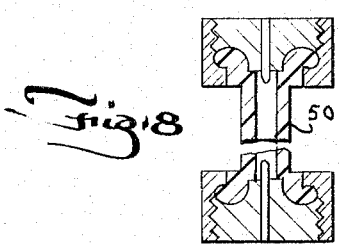

FIGURES 7 and 8 show an alternative capsule configuration having features to permit an alternative technique of sealing. The capsule body shown as 50 is similar to that heretofore described in that the center portion 50a is comprised of interior and exterior curved surfaces held to corresponding radii. Adjoining the center portion are end portions identified as 50c and 50d, which are flared outwardly into portions 50e and 50f, each having a rounded exterior configuration leading to an inner bore which is substantially cylindrical and adjoins a tapering transition portion leading to the configuration of the center portion of the capsule. As indicated in FIGURE 8, a capsule seal structure is provided having at each end an outside sleeve such as 52, substantially cylindrical and threaded interiorly to receive a center plug member 54 carrying an electrode structure 56. The exterior of each plug member 54 is threaded to engage the threading of 52 and the forward portion is shaped to entrap and compress the capsule portions 50e and 50f to effect a sealing of the conductive fluid and mounting of the electrodes. With this embodiment one of the plugs is inserted and the capsule is then loaded with conductive fluid and the other plug is then inserted entrapping the fluid therein.

Figure 10:
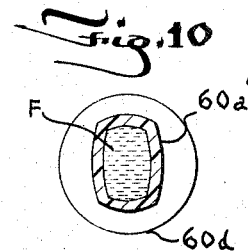
Figure 9:
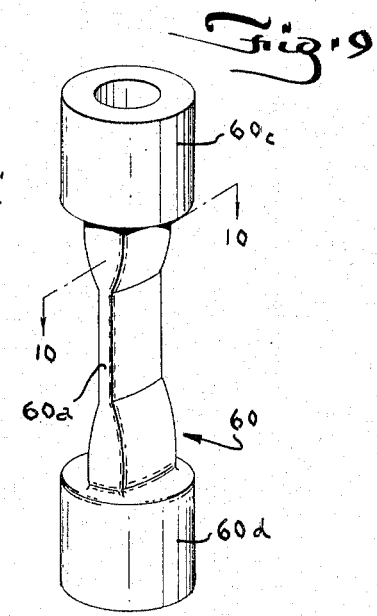

FIGURES 9 and 10 show an alternative version of the capsule according to the invention including a capsule body 60 having a center portion 60a and end portions 60 and 60b integrally formed therewith. The end portions 60c and 60d are substantially identical to the end portions described with respect to FIGURES 1 through 6 and it is contemplated that a sealing and mounting assembly similar to that shown with respect to those figures may be used. The center portion 60a includes a center zone which is of a configuration identical to capsule heretofore described, supported between and adjoining enlarged enlarged tapered portions shown as 60a'. The interior surfaces of the tapered portions are enlarged as shown in FIGURE 10 to accommodate an additional volume of conductive fluid adjoining the body conductive fluid displaced by deformation of capsule in the center zone. The embodiment of FIGURES 9 and 10 better accommodates the necessary distension of the capsule material caused by displacement of the conductive fluid. The embodiment of FIGURES 9 and 10 is preferred for use with capsule materials which have characteristics of greater hardness than those previously suggested or in capsules used in higher current application wherein a greater conductive fluid cross-section is necessary.

Figure 12:
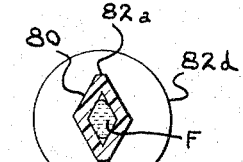
Figure 11:
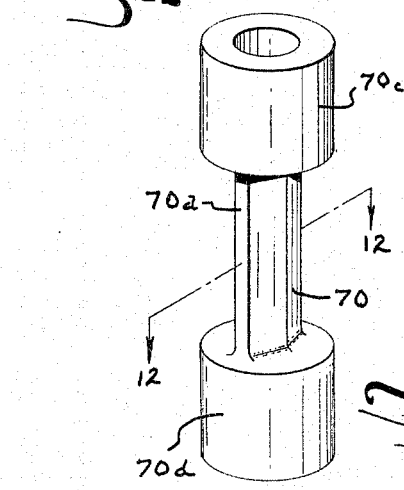

FIGURES 11 and 12 show an alternative embodiment including a capsule body 70 having a center portion 70a and end portions 70c and 70d. The end portions are substantially identical to the end portions described with respect to FIGURES 1 through 6 and are adapted to be affixed and sealed by similar means. The center portion 70a differs from the center portion of the embodiment described with respect to FIGURES 1 through 6 in that it is generally diamond shaped in cross-section, interiorly and exteriorly. The general configuration of the surfaces is however held to be an approximation of the radii relationship heretofore described and is intended to operate in the same manner. The embodiment of FIGURES 11 and 12 is preferred in uses wherein the capsule material is more flexible than that of the examples given.

Figure 14:
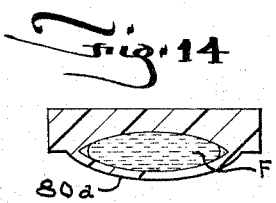
Figure 13:
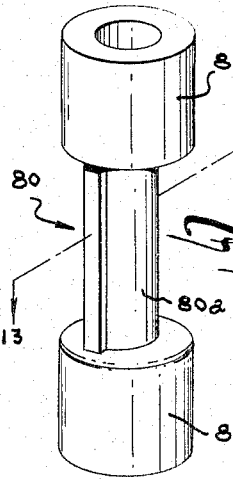

FIGURES 13 and 14 show an alternative embodiment including a capsule body 80 having a center portion 80a and end portions 80c and 80d. The end portions again are similar to those of FIGURES 1 through 6 and are affixed and sealed in a similar manner. The center portion 80a is comprised of a shaft of flexible material relatively thicker on one side than on the other to include a bulge defining the volume for the conductive fluid. The interior and exterior configuration of the bulge are maintained on desirable radii in accordance with the features described. The remaining portion thereof and the opposing exterior surfaces of the center portion are relatively flat. With the embodiment of FIGURES 13 and 14 the mechanism for effecting deformation for closure and switch action includes one member similar to 30 in function, but substantially flat to engage the rear flat surface of the center portion of the capsule. The opposing member is similar to 32 curved about a radius similar to the curvature of the capsule cavity. The embodiment of FIGURES 13 and 14 is preferred in multiple uses wherein the driving mechanism is operated in straight line action, as for example in a toggle switch or push button device.

Figure 16:
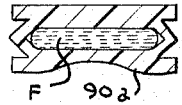
Figure 15:
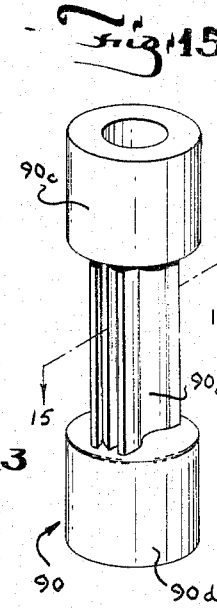

FIGURES 15 and 16 show a further alternative version including a capsule body 90 having a center portion 90a and end portions 90c and 90d. The end portions again would be similar to the version described relative to FIGURES 1 through 6. The center 90a is substantially box-like formed of a flat sided portion and a thickened concave portion separated by thin walls suitably shaped to assist in the deformation of the capsule material for switch operation. The interior surface of the capsule is suitably shaped at its corners to provide an effective closure in the manner above described under forces applied through a mechanism having relatively straight planar surfaces adapted to cooperate and engage the exterior surfaces of the center portion. The concave portion operates to load the edges of the capsule to a greater extent than the center to assure closure at the corners. The embodiment of FIGURES 15 and 16 is preferred in uses where the material employed is relatively soft or where a straight line action driving mechanism is desired.

In the various embodiments of FIGURES 7 through 16 various aspects of the invention have been covered which may not function identically as well as the embodiment of FIGURES 1 through 6 with respect to accommodating closure. These embodiments, however, represent preferred modes of practicing the invention wherein factors of preference are weighted toward a choice of material or of closure mechanism, or cost of production. It is thought that the description and characteristics of the invention in its various aspects sufficiently delineates features enabling a determination of which embodiment to employ and that those skilled in the art may, through following the teachings of the invention, make a choice of embodiment without departing from the scope of the invention.

Referring now to a multiple switch embodiment employing the capsule of the invention, FIGURES 17 through 19 relate to a rotary switch 120 capable of being driven to step through successive positions effecting a scanning of a series of circuits. FIGURES 17–19 show the switch 120 to be comprised of an outer housing shell 122 of relatively hard insulating material having an interior surface 122a curved to engage and support the individual capsules shown as 130. Shell 122 includes a portion 122b supporting a lower plate member 124 at a portion 122c supporting an upper plate member 126. Inwardly of member 124 is a portion 124a adapted to provide support for a bearing 125 carrying one end of a switch actuating arm 140. An intermediate portion 124b serves to support the bottom ends of the switch capsules 130. A center contact post such as 127 is fitted through 124b into each capsule joining an electrode which extends within the capsule to contact the conductive fluid therein.

Each of the posts 127 may be taken to represent an output from the switch and a further post 127, not shown, extends through the body of 120 to the upper plate 126 thereof to contact a bus member 129 secured thereto as shown in FIGURE 1. The bus member is electrically commoned to the upper electrodes of each capsule through a pin shown as 131 soldered to the bus at a point over each capsule. An input through the bus member then may be selectively output through any one of the capsules or upon operation of the switch with a constant rotation of member 140 through its shaft 140a, a series of output pulses may be produced from the capsules from a constant input. A centrally disposed member 128 is provided and apertured about its periphery as at 128a to accommodate actuating members 132 in a position aligned with each capsule 130. The members 132 are supported within the aperture 128a for free sliding movement radially along the aperture axis. The forward surface of each actuator 132 is rounded for the purpose described relative to member 132 in FIGURES 3 and 4 and the rear surface thereof is rounded as at 132b to rest and bear against the outer surface of portion 140b of the actuator 140, which is circular except for an indentation 140c. The shaft 140a is adapted to rotate member 140 in steps to a selected capsule position or to rotate constantly scanning the various capsule positions. With the slot 140c positioned as shown in FIGURE 18, each of the capsules of the switch is closed except for the capsule aligned with 140c. In the position of FIGURE 18 the particular actuator 132 in alignment with 140c is permitted to be pushed inwardly by the capsule to permit the conductive fluid to maintain a path of conduction therethrough. Rotation of member 140 to the right would then serve to close the capsule shown as open as the surface of 140a has its effective radius increased by the configuration thereof to press against 132 and drive such outwardly to engage and deform the capsule. At the same time the surface of 140b would have its effective radius decreased relative to the capsule to the right of the one shown open to permit the related actuator 132 to be forced inwardly by the capsule and complete the circuit related to such capsule. Further movement would then sequentially close and open successive capsules about the periphery of the switch. In the arrangement of FIGURES 17–19 the rotary movement of 140 does not load or wear against the capsules in a rotary sense, since the closures are effected through actuators confined to radial movement.

Figure 20:
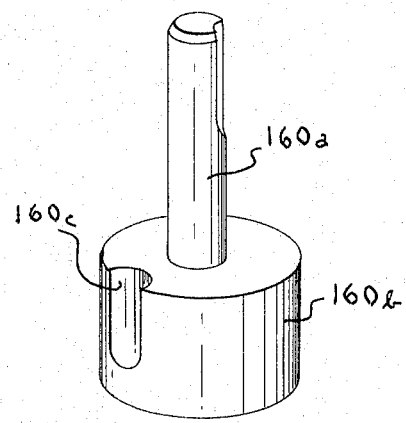
FIGURE 20 is a perspective of the driving member of an alternative version of the stepping switch of the invention.
Figure 21:
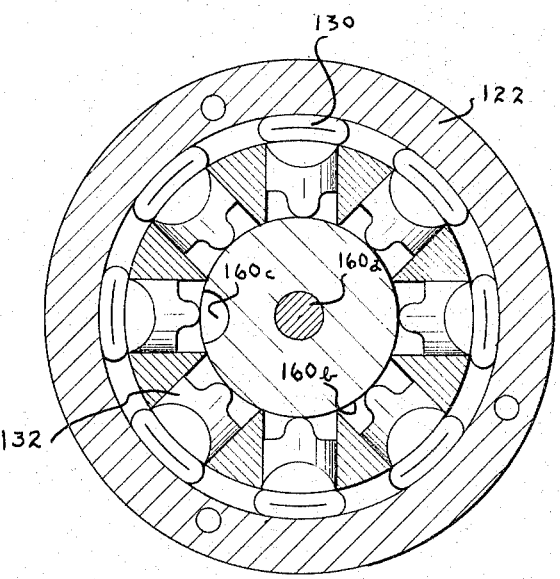
FIGURE 21 is a cross-section showing the interior arrangement of the alternative version of the stepping switch served by the member of FIGURE 20.

An alternative version of a stepping switch is shown in FIGURES 21–22. The member indicated as 160 in FIGURE 20 includes a shaft 160a and a portion 160b having a constant exterior surface along the bottom portion thereof and a generally cylindrical surface along the top portion thereof with the exception of a single slot shown as 160c extending axially along the length of 160b for approximately half its length. The remaining portions of the switch are similar to that previously described with respect to the capsules, housing members and the actuating members with the exception that the interior of the switch is relieved to permit a vertical movement of 160 from the position shown in solid lines in FIGURE 22 upwardly to the position shown in dotted lines. As one further slight difference the lower surface indicated as 132d of each actuator is slightly rounded to cooperate with the bottom surface of recess 160c to drive the appropriate actuator 132 outwardly upon the member 160 being driven upwardly. With the switch of FIGURES 20–22 in the downward position a single capsule is undeformed to provide a selected completion of a circuit path with all other capsules being deformed and effectively closed. Rotation of the member 160 in the position shown in FIGURE 22 will operate to sequentially scan the last capsules in the manner previously described. A vertical movement upward will operate to close all circuit paths and rotary movement in the upper position will take place with all capsules remaining closed and all circuits effectively open.

With arrangement of FIGURES 20–22 and the member 160 in the upper position, the switch may be driven around without making and breaking contact to a point wherein the slot 160 is in alignment with a selected capsule and circuit path, thereafter the member 160 may be driven or released downwardly to thus open the associated capsule and close the selected circuit path. This reduces the wear on the capsules and points in the selection of paths without closing circuits. It is contemplated that any suitable rotary stepping motor may be utilized to drive the shaft 140 or 160 and similarly any suitable relay construction may be utilized to obtain the vertical movement necessary for both operations of the switch of FIGURES 20–22. It is preferred that a latching relay be utilized to assure a positive action of the member 160.

In an actual embodiment manufactured in accordance with the principles of the invention the capsule center portion was made to have an interior surface radius of approximately 125-thousandths of an inch, a wall thickness of approximately ten thousandths of an inch. The actuating member similar to 32 was made to have a radius of approximately 125-thousandths of an inch, with a vertical curvature on the order of twenty thousandths of an inch radius. The foregoing dimensions were carried in capsules of both polyurethane and polyethylene and driven in tests at approximately 1 ma. at 28 volts through more than a million cycles without failure of seal or contact. The voltage wave forms effective during switching, as viewed on an oscilloscope showed the operation of the switch to be substantially bounce-free with little or no noise or arcing and no observable unwanted transients.

The foregoing descriptions are, of course, representative embodiments of preferred modes of practice of the invention set down to meet the requirements of disclosure. The full scope of the invention with the various equivalents which will be apparent to those skilled in the art is left to the accompanying claims.

What is claimed is:

1. An electric switch comprising a capsule of flexible insulating material, said capsule being substantially filled with conductive fluid and including a portion of relatively thin walls adapted to be deformed to effect switch action, means adapted to be relatively moved to pinch said portion to cause a separation of conductive fluid, said means including members each having cross-sectional surfaces related to the cross-sectional surfaces of said portion to reduce working of the portion material, the said surface of one of said members being rounded to a radius in a transverse sense relative to said cross section which is slight relative to the length of said portion.

2. The switch of claim 1 wherein said portion has arcuate cross-sectional surfaces and said members having complementary arcuate cross-sectional surfaces.

3. An electric switch comprising a body of insulating and flexible material having circular end portions of a given material thickness joined by a center portion of less material thickness including a convexo-convex cross section at least in a zone thereof, a passage extending through said end and center portions, said passage being substantially but not completely filled with conductive fluid, hollow electrodes extending through said end portions into said fluid and circular bands of metallic material surrounding said end portions and crimped inwardly to force the material thereof to seal said electrodes against escape of fluid, means disposed proximate said center portion zone adapted to be driven to deform said center portion to separate said fluid for switch action and substantially close the interior surface of said center portion at said zone to maintain fluid separation, the said means including members having cross-sectional configurations substantially matching the configuration of said zone whereby to effect said deformation with a minimum compressive loading of the material of said center portion.

4. An electrical switch comprising in combination a capsule having substantially circular end portions joined by an integral center portion, the end portions having relatively thick wall sections and sealing means affixed thereto, electrodes extending within the capsule volume, the center portion being formed by a thin-walled flexible material having an interior configuration defined by arcuate surfaces intersecting an abrupt angle along the length of said second portion, the said capsule being substantially filled with a conductive fluid, the adhesive force characteristics of said second portion material in conjunction with said abrupt angle being so related to the cohesive forces of the conductive fluid as to maintain a slight void extending along the intersection of said surfaces formed by the radiused surface of said conductive fluid, means adapted to engage and deform said second portion to effect switch action, said means having surfaces of a radius related to the arcuate surface of said second portion and of a thickness which is a fraction of the length of said second portion whereby upon movement of closure of said means the said conductive fluid parts with a snap action and the second portion material is thereafter driven in substantially complete closure to prevent a reestablishment of conduction therethrough.

5. An electrical switch comprising a plurality of flexible capsules containing conductive fluid each having at least two spaced electrodes to be connected to circuits of use and each having a lenticular cross-sectional configuration, a mechanism for deforming said capsules to break the path of conductive fluid contained therein for switch action, said mechanism including a first member having a plurality of segments each of a concave cross-sectional configuration related to the cross-sectional configuration of each capsule, an actuator having a convex configuration and positioned to engage each capsule and deform such for switch action and means adapted to drive each actuator in movement of closure to deform the said capsules.

6. The switch of claim 5 wherein said first member segments form an interior surface which is substantially circular and the capsule configuration is formed by arcs drawn on a radius approximating that of the interior surface of the outer member.

7. A rotary stepping switch including a plurality of capsules of flexible insulating material each substantially filled with conductive fluid and having electrodes extending to be connected to circuits of use, a housing including an outer member of relatively hard material with the said capsules being held thereagainst, an inner member including radially disposed apertures each housing an actuator, a center member including a shaft adapted to be driven in rotary motion and a cylindrical member having a slot therein, the said cylindrical member having a diameter such as to drive all of said actuators outwardly except the one disposed adjacent said slot whereby to close all of said capsules except the one radially aligned with said slot.

8. The switch of claim 7 wherein said cylindrical member includes a further portion which is cylindrical and said shaft is adapted for being driven in vertical movement to effect closure of all capsules in one position or all but one capsule in a second position.

References Cited by the Examiner

UNITED STATES PATENTS

| | | | |
|---|---|---|---|
| 2,195,199 | 3/1940 | Becker | 200—152 |
| 2,490,523 | 12/1949 | Kneisly | 200—153 X |
| 2,705,310 | 3/1955 | Hodge | 339—144 |
| 2,720,562 | 10/1955 | McLaughlin | 200—32 |
| 2,985,870 | 5/1961 | Lindberg | 200—152 X |
| 3,146,519 | 9/1964 | Redwine | 339—276 X |
| 3,160,722 | 12/1964 | Sellers | 200—60 |
| 3,177,327 | 4/1965 | Weiss | 200—152 |

ROBERT K. SCHAEFER, *Primary Examiner.*

H. HOHAUSER, *Assistant Examiner.*